United States Patent
Sakaguchi et al.

[11] Patent Number: 6,075,562
[45] Date of Patent: Jun. 13, 2000

[54] IMAGE INPUTTING APPARATUS

[75] Inventors: Norihiro Sakaguchi, Kanagawa; Tatsutoshi Kitajima, Tokyo; Junichi Ikeda, Miyagi, all of Japan

[73] Assignee: Ricoh Company, Ltd., Tokyo, Japan

[21] Appl. No.: 08/828,344

[22] Filed: Mar. 28, 1997

[30] Foreign Application Priority Data

Mar. 29, 1996 [JP] Japan ................................. 8-077916
Mar. 3, 1997 [JP] Japan ................................. 9-048302

[51] Int. Cl.⁷ .............................. H04N 9/73; G03B 7/00; G03B 13/00
[52] U.S. Cl. ........................... 348/223; 348/362; 348/356
[58] Field of Search .................................... 348/370, 371, 348/362, 366, 223, 224, 227, 228, 350, 354, 356

[56] References Cited

U.S. PATENT DOCUMENTS

| | | | |
|---|---|---|---|
| 4,780,766 | 10/1988 | Nutting | 348/229 |
| 5,319,449 | 6/1994 | Saito et al. | 348/223 |
| 5,402,174 | 3/1995 | Takahashi | 348/347 |
| 5,438,367 | 8/1995 | Yamamoto et al. | 348/371 |
| 5,504,584 | 4/1996 | Soeda | 348/371 |
| 5,534,916 | 7/1996 | Sakaguchi | 348/222 |
| 5,550,587 | 8/1996 | Miyadera | 348/223 |
| 5,568,194 | 10/1996 | Abe | 348/223 |
| 5,655,170 | 8/1997 | Yamamoto et al. | 348/370 |
| 5,808,681 | 9/1998 | Kitajima | 348/371 |
| 5,857,121 | 1/1999 | Arai et al. | 348/334 |

FOREIGN PATENT DOCUMENTS

| | | | |
|---|---|---|---|
| 2-288575 | 11/1990 | Japan | H04N 9/04 |
| 3-154576 | 7/1991 | Japan | H04N 5/232 |
| 7-59087 | 6/1995 | Japan | H04N 9/04 |

*Primary Examiner*—Wendy Garber
*Assistant Examiner*—Luong Nguyen
*Attorney, Agent, or Firm*—Oblon, Spivak, McClelland, Maier & Neustadt, P.C.

[57] ABSTRACT

In a digital camera, a pre-measuring device obtains color temperature information according to external light in a preliminary exposure. A white balance control value is then determined. The white balance is subsequently adjusted when a strobe light is generated. A regular exposure is thereafter made using the strobe light and the image is recorded for future processing.

6 Claims, 12 Drawing Sheets

| AREA | STROBE LIGHT : EXTERNAL LIGHT |
|---|---|
| A1 | 5 : 5 |
| A2 | 6 : 4 |
| A3 | 7 : 3 |
| A4 | 5 : 5 |

IMAGE INPUTTING APPARATUS

FIELD OF THE INVENTION

1. Background of the Invention

The present invention relates to an image inputting apparatus such as a digital still video camera (described as digital camera hereinafter) for photographing an image and recording the image in a storage medium such as a memory card or the like, and more particularly to an image inputting apparatus which can reduce unnatural characteristics due to difference between a color tone of an object to be photographed and that of the background even under illumination by a strobe.

2. Description of the Related Art

In an image inputting apparatus such as a digital camera, in order to obtain a desired image, photographing is carried out using a strobe as a supplementary light source regardless of time. photographing under some conditions for As adjustment of white balance under transitional illumination by such as a light source as a strobe, there have been various types of control system for adjusting white balance.

For instance, Japanese Patent Publication No. HEI 7-59087 discloses the technology for adjusting white balance according to brightness and a color temperature of an object to be photographed and a system for obtaining appropriate color balance even under mixed light from a strobe and that from another light source with the technique for adjusting white balance according to brightness of an object to be photographed and a range from the object to be photographed.

However, in the white balance control system in the conventional digital cameras, as photographing is carried out, when light is generated from a strobe, adjusting white balance according to a color temperature of the strobe without using a preset value for a color temperature detected from a light source other than the strobe, there have been the problems (1) to (3) each described below.

(1) Generally a color temperature of strobe light is around 5800 [K], substantially higher as compared to and largely different from the light usually used in a room, so that photographing is carried out adjusting white balance by referring only a color temperature of strobe light as a reference. In this case, the technique for adjusting white balance as described above is applicable in a range fully covered by strobe light, but room light with a lower color temperature becomes dominant as the strobe light becomes weaker, the technique for adjusting white balance described above is not applicable. Namely when adjustment of white balance becomes inappropriate, a color tone of an object to be photographed largely varies from that of the background, so that the general color tone becomes unnatural. For instance, in setting with a small gain value for B (Blue), a photographed image is apt to become yellowish, which will give the impression that the white balance has generally been offset.

(2) Also in a case where an object to be photographed has brightness higher than that generated by light automatically generated by an automatic strobe, in the compulsory light emitting mode such as the "daytime synchronous mode" in which a strobe is compulsorily caused to emit light, contrary to the case (1) above, a color temperature of external light becomes higher as compared to that of strobe light. For this reason, the photographed image has inappropriate white balance with a bluish color tone, and is unnatural as a whole.

(3) In the technique for adjusting white balance taking into account a range to an object to be photographed, in a case where strobe light is not fully irradiated onto the object to be photographed, color temperature information for peripheral light sources is taken into consideration as a reference for control, but in a case where the strobe light is fully irradiated onto the object to be photographed, the problems similar to (1) and (2) above will occur.

SUMMARY OF THE INVENTION

It is an object of the present invention to provide an image inputting apparatus which can reduce unnatural characteristics due to a difference between a color tone of an object to be photographed and that of the background even under light generated by a strobe.

With the present invention, color temperature information for external light is obtained during preliminary exposure, a control value for white balance is decided according to the color temperature information for external light during regular exposure, and white balance when strobe light is generated according to the decided control value is adjusted, so that appropriate white balance can be maintained irrespective of an object to be photographed, and for this reason the unnatural characteristics due to a difference between a color tone of an object to be photographed and that of the background can be reduced under strobe light.

With the present invention, a control value for white balance when strobe light is generated is decided taking into account not only a preset white balance control value for the color temperature information of strobe light, but also a white balance control value based on the color temperature information for external light obtained during preliminary exposure without strobe light under default photographing conditions, so that appropriate white balance can be maintained irrespective of an object to be photographed, and unnatural characteristics due to a difference between a color tone of the object to be photographed and that of the background can be reduced.

With the present invention, a white balance control value when strobe light is generated is decided further using proportional allotment corresponding to a range based on range information, so that appropriate white balance can be maintained irrespective of any situation of an object to be photographed nor of a range to an object to be photographed, and unnatural characteristics due to a difference between a color tone of the object to be photographed and that of the background can be reduced.

With the present invention, a value obtained by multiplying a result of the proportional allotment by a coefficient based on the brightness information is decided as a white balance control value when strobe light is generated, so that appropriate white balance can be maintained irrespective of any situation of an object to be photographed a range to an object to be photographed nor of optical conditions around the object to be photographed, and for this reason the unnatural characteristics due to a difference between a color tone of the object to be photographed and that of the background can be reduced.

With the present invention, a white balance control value when strobe light is generated is decided only in a case where the compulsory light emitting mode has been set, so that the unnatural characteristics of a photographed image can be eliminated even in the compulsory light emitting mode such as the "daytime synchronous mode".

With the present invention, further proportional allotment is executed according to a range based on corrected range information for a main object to be photographed, so that a white balance control value based on an accurate range to an object to be photographed can be set, and for this reason, more appropriate white balance can be realized.

With the present invention, proportional allotment is executed according to a range based on range information for a position of an object to be photographed, said position being corrected by an operator, for a main object to be photographed, so that a white balance control value based on accurate range information for an object to be photographed can be set, and for this reason more appropriate white balance can be realized.

With the present invention, further proportional allotment is executed according to a range based on range information for a position of an object to be photographed, said position corrected by inputting sight line, for a main object to be photographed, so that a white balance control value can be set according to accurate range information for an object to be photographed, and for this reason more appropriate white balance can be realized.

With the present invention, a white balance control value when strobe light is generated is decided by acquiring temperature information and taking into account the temperature information, so that appropriate white balance can be maintained even against changes in the photographing conditions due to a temperature of the apparatus.

With the present invention, a white balance control value when strobe light is generated is decided, by extracting a photographed object area from a result of preliminary exposure, only for the photographed object area, so that appropriate white balance can be maintained for the object to be photographed.

With the present invention, a focal position is extracted by scanning as a photographed object area, so that a photographed object area is extracted during scanning, and for this reason, a period of time required for preliminary exposure for regular exposure can be shortened.

With the present invention, scanning is started from an arbitrary position irrespective of a result of exposure, so that the entire scan time is shortened, and for this reason a pre-processing time for regular exposure can be shortened.

With the present invention, a focal position detection size is made smaller and subsequent scanning is executed with the smaller detection size in a case where a brightness signal exceeds a preset level, so that, by setting a focal position detection size prior to detection of an object to be photographed to a somewhat larger value, the total times of scanning is reduced, and also a focal position can accurately be acquired by making the focal position detection size smaller after focusing, and with this feature a scan time before detection of an object to be photographed from a result of exposure can be shortened.

With the present invention, a range to be scanned for a result of exposure is divided to a plurality of zones, and a control value is independently decided for each zone according to proportional allotment between luminance of strobe light and that of external light in each zone, so that appropriate white balance can be maintained for an object to be photographed by allotting a larger portion to the zone where the object to be photographed is located.

With the present invention, high frequency elements are extracted from a brightness signal according to photographing conditions such as contrast, and a photographed object area is extracted according to the brightness signals for the high frequency elements, so that a range for extraction of high frequency elements changes according to the photograph conditions, and with this feature, a photographed object area can be extracted according to the photographing conditions.

With the present invention, temperature information for external light is obtained and also a photographed object area is extracted according to a result of preliminary exposure, a white balance control value for strobe light is decided according to the extracted color temperature information only for the extracted photographed object area, and a result of regular exposure using the strobe light with the decided control value is subjected to signal processing, so that signal processing is executed with appropriate white balance irrespective of an image of an object to be photographed, and for this reason, the unnatural characteristics due to the difference between a color tone of an object to be photographed and that of the background can be reduced under strobe light.

Other objects and features of this invention will become understood from the following description with reference to the accompanying drawings.

DESCRIPTION OF THE PREFERRED EMBODIMENTS

Figure 1:
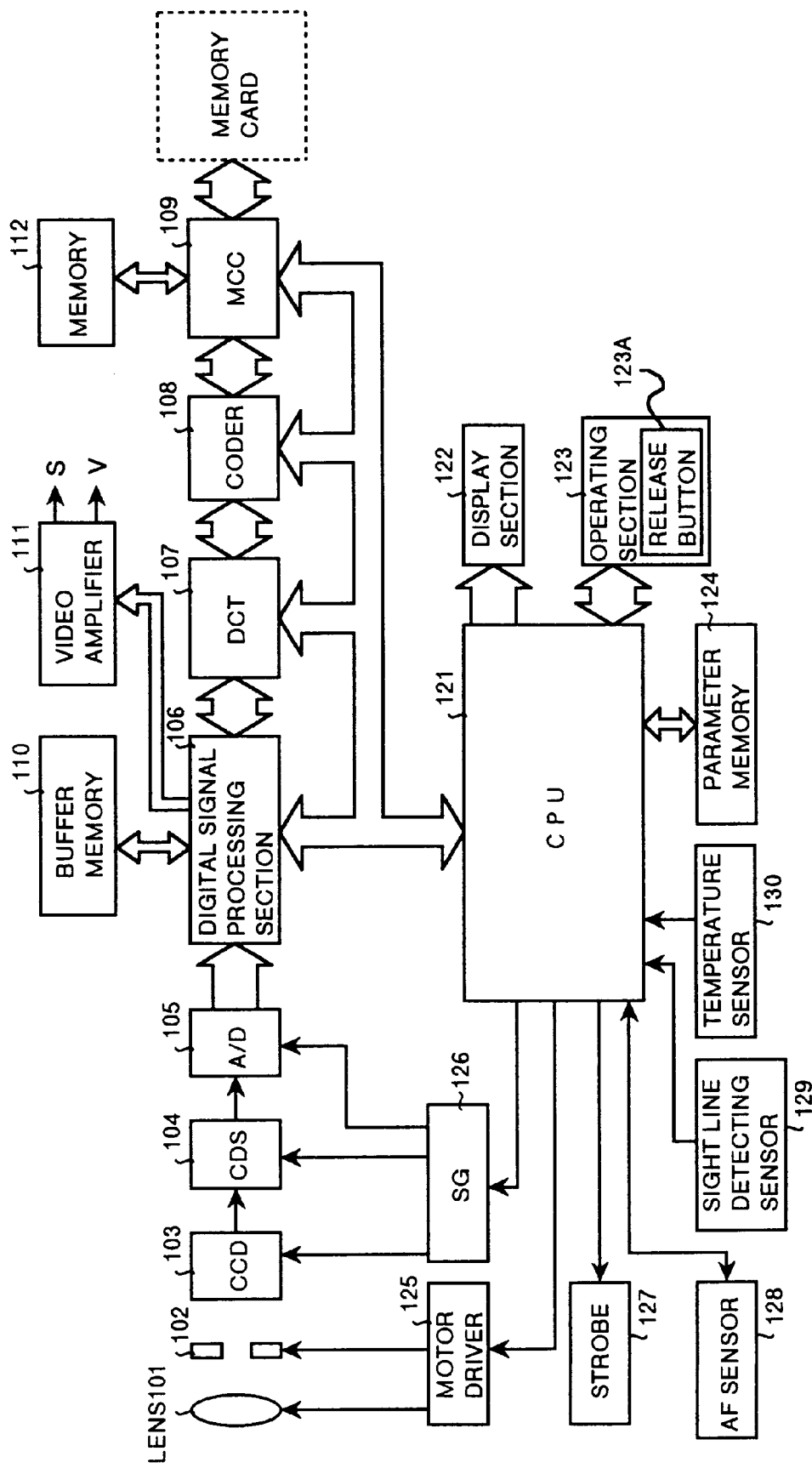
FIG. 1 is a block diagram showing a configuration of a digital camera according to Embodiment 1 of an image inputting apparatus according to the present invention.

FIG. 1 is a block diagram showing a configuration of a digital camera according to one embodiment of the image inputting apparatus according to the present invention. In FIG. 1, the digital camera according to this embodiment comprises, for instance, a lens 101, a mechanism 102 including an automatic focus or the like, a CCD 103, a CDS circuit 104, an A/D converter 105, a digital signal processing section 106, a DTC 107, a coder 108, an MCC 109, a buffer memory 110, a video amplifier 111, an internal memory 112, a CPU 121, a display section 122, an operating section 123, a parameter memory 124, a motor driver 125, an SG (control signal generating) section 126, a strobe 127, an AF sensor 128, a sight line detecting sensor 129, and a temperature sensor 130.

The lens unit comprises the lens 101, and a mechanism 102 including an automatic focus/diaphragm/filter section, and a mechanical shutter of the mechanism 102 executes simultaneous exposure for two fields. The CCD (charge coupled device) 103 converts an image inputted via the lens unit to electric signals (analog image data). The CDS (correlation double sampling) circuit 104 is a circuit for reducing noises in a CCD type of image pickup element. The A/D convertor 105 converts analog image data inputted via the CDS circuit from the CCD 103 to digital image data. Namely, an output signal from the CCD 103 is converted to a digital signal via the CDS circuit 104 by the A/D convertor 105 with an optimal sampling frequency (for instance, an integral number times larger as compared to a sub-carrier frequency of an NTSC signal).

The digital signal processing section 106 divides the digital image data inputted from the A/D convertor 105 to data for color difference and those for brightness and subjects each of the divided data for various types of processing such as correction, and compression or extension of an image. The DCT (Discrete Cosine Transform) 107 executes orthogonal transformation which is a step of the processing for compression/extension of an image according to the JPEG standard, and the coder (Huffman Encoder/Decoder) 108 executes such a operation as Huffman encoding/decoding which is a step of the processing for compression or extension of an image according to the JPEG standard.

The MCC (Memory Card Controller) 109 temporarily stores therein images having been subjected to processing for compression and voices fetched from a microphone and digitalized, subjects the images and voices to simultaneous processing, records and read out the image and voice data into the internal memory 112 or a memory card. The CPU 121 controls operations of each of the sections described above according to instructions from the operating section 123 or to instructions from an external device (not shown herein) such as a remote controller.

The display section 122 is realized with such devices as an LCD, an LED, and an EL, displays digital image data for photographed images or recorded image data having been subjected to extension, and also displays a state of the digital camera or other types of information on a screen in the mode display section therein. Also the operating section 123 has buttons for executing various types of setting such as a selection of a function or instruction for photographing from the outside. This operating section 123 has a release button 123A and outputs a release signal to the CPU 121 in response to an operation of this release button 123A.

In the configuration shown in FIG. 1, the lens 101, mechanism 102, CCD 103, CDS circuit 104, and A/D convertor 105 form a photographing means; the digital signal processing section 106 forms a pre-measuring means and a photometric means; the parameter memory 124 forms a setting means; the operating section 123 forms a mode setting means and a position specifying means; the sensor 128 forms a range measuring means; and the control value deciding means is realized by the CPU 121 which executes a control program stored in a memory such as a ROM not shown herein.

The sight line sensor 129, which is a sight line inputting means, detects a position of an operator's sight line, although the concrete configuration is not shown herein. The CPU 121 corrects a position of a main object to be photographed according to the position of sight line. Also the temperature sensor 130, which is a temperature information acquiring means, acquires temperature information to be taken into account when a white balance control value is to be decided.

Figure 2:
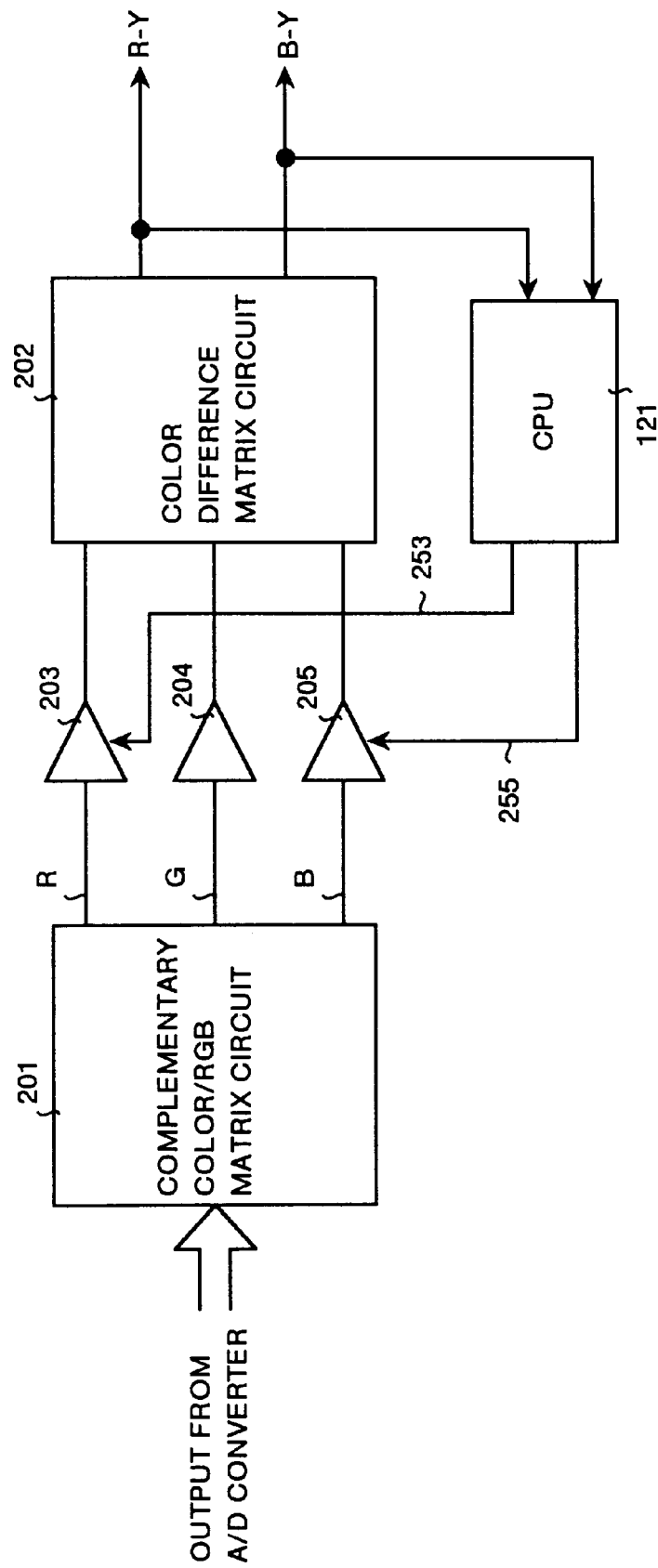
FIG. 2 is a circuit block diagram showing sections relating to white balance control in a digital signal processing section as well as in a CPU of the digital camera according to Embodiment 1.

FIG. 2 is a circuit block diagram showing sections relating to white balance control in the digital signal processing section 106 and the CPU 121 in this embodiment. In FIG. 2, there is a complementary color/RGB matrix circuit 201, and a color difference matrix circuit 202. Herein, R, G, and B indicate signals for Red, Green, and Blue respectively. Also, there is an R gain amplifier, a G gain amplifier 204, at a B gain amplifier 205, and at 253 and 255 R and B gain amplifier control signals for controlling amplification factors for the R and B gain amplifiers 203 and 204, respectively.

At first, the complementary color/RGB matrix circuit 201 executes matrix computing expressed by the following equation:

$$\begin{pmatrix} R \\ G \\ B \end{pmatrix} = \begin{pmatrix} KRa & KRb & KRc & KRd \\ KGa & KGb & KGc & KGd \\ KBa & KBb & KBc & KBd \end{pmatrix} \begin{pmatrix} G+Cy \\ Mg+Ye \\ Mg+Cy \\ G+Ye \end{pmatrix} \quad (1)$$

Herein KRa to KBd are preset coefficients, G+Cy indicates a signal component for green pixels and cyan pixels mixed in a vertical transfer path, Mg+Ye indicates a signal component for Magenta pixels and yellow pixels mixed in the vertical transfer path, Mg+Cy indicates a signal component for Magenta pixels and cyan pixels mixed in the vertical transfer path, and G+Ye indicates a signal component for green pixels and yellow pixels mixed in the vertical transfer path. Namely, the complementary color/RGB matrix circuit 201 multiplies the signal components for these mixed pixels by a preset coefficient matrix and outputs three raw color signals for red, green and blue.

It should be noted that the computational form for matrix computing is applicable because, in the IT-CCD generally used in a cam coder, a pair of mixed pixels is varied for an odd number field and an even number field respectively by adding signals for pixels in two lines in the vertical direction for improving the dynamic resolution, and in most cases, four filters for complimentary colors of green, cyan, Magenta, and yellow are used, so that the four types of pairs described above are realized.

The color difference matrix circuit 202 generates color difference signals R−Y and B−Y from R signal and B signal amplified or attenuated according to the R and B gain amplifier control signals 253 and 255 as well as from a brightness signal Y.

Figure 3:
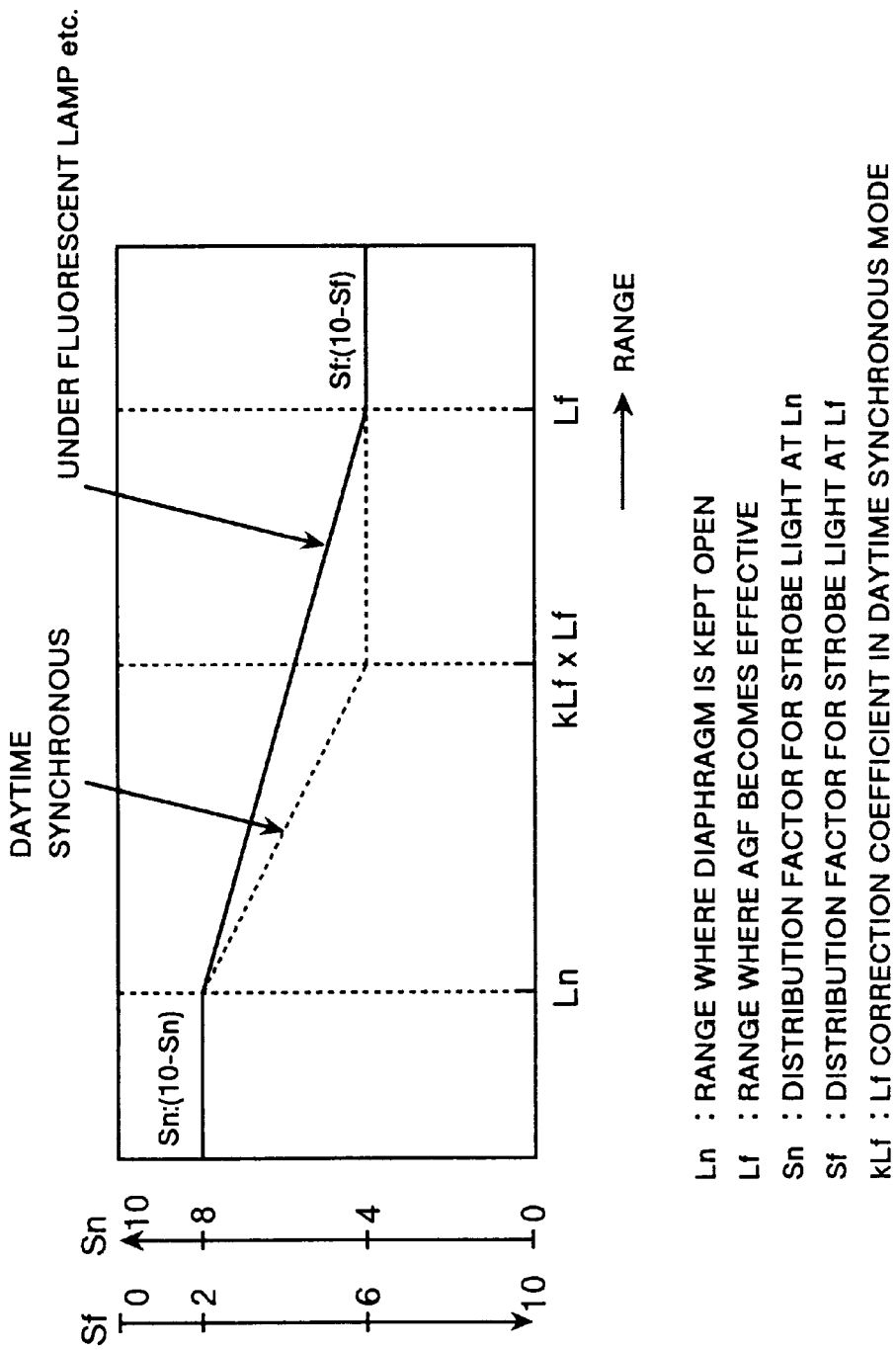
FIG. 3 is an explanatory view showing a concept for proportional allotment between a preset value for a color temperature of external light and that for strobe light in Embodiment 1.
Figure 4:
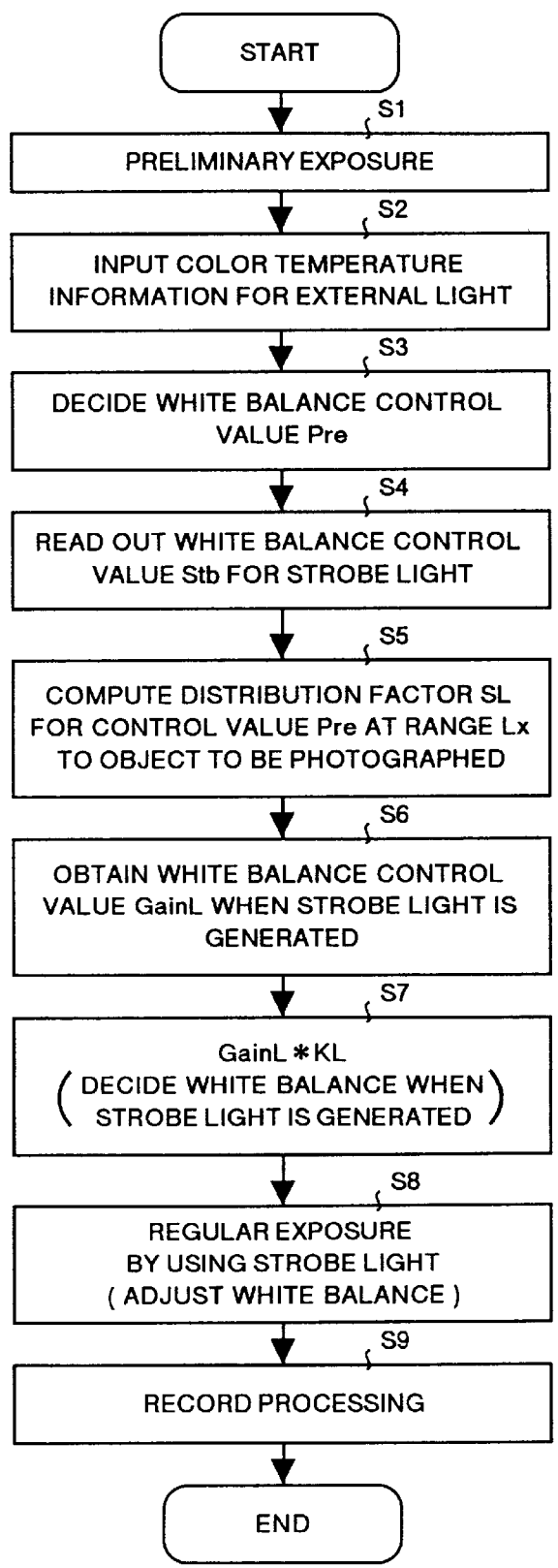
FIG. 4 is a flow chart showing operations in Embodiment 1.

With the configuration as described above, the next description is made for operations of the digital still camera according to this embodiment with reference to FIG. 3 and FIG. 4. FIG. 3 is a graphic view for explanation of a concept for proportional allotment between a preset value for a temperature of external light and that for strobe light in Embodiment 1, and FIG. 4 is a flow chart showing operations in Embodiment 1.

When the release button 123A is operated after the processing for initialization or the like has been executed, preliminary exposure is executed under the default photographing conditions without generating strobe light (step S1). It is assumed herein that preset values are prepared as default values for a shutter speed, a diaphragming value, gain values for the R gain amplifier 203 and B gain amplifier 205 or the like.

In this step, the digital signal processing section 106 obtains color temperature information for external light as a result of pre-measurement according to R, G, and B signals through an optical unit (comprising the lens 101, mechanism 102, CCD 103, CDS circuit 104, and A/D convertor 105) which corresponds to a photographing means. The CPU 121 receives color temperature information from the digital signal processing section 106 (step S2), and decides a white balance control value Pre according to the color temperature information for external light (step S3).

Then, the CPU 121 reads out a white balance control value Stb against color temperature information for strobe light previously set in the parameter memory 124 (step S4). Then, a range Lx to the object to be photographed has been notified from the AF sensor 128 which is a range measuring means, and the CPU 121 computes a distribution factor SL for the control value Pre at a range Lx (step S5).

$$SL = Sn + \{(Sf-Sn)/(Lf-Ln)\} \times (Lx-Ln) \quad (2)$$

wherein
Ln is a range to which the white balance is applicable for the control value Stb
Lf is a range to which the white balance is applicable for the control value Pre (0<Ln<Lf).
Sn is a distribution factor satisfying the following equation for the range Ln:

$$Pre:Stb = Sn:(10-Sn)$$

Sf is a distribution factor satisfying the following equation for the range Lf:

$$Pre:Stb = Sf:(10-Sf)(0<Sn<Sf<10)$$

This description is made for a concept for the equation (2) above with reference to FIG. 3. In FIG. 3, Ln indicates a range to which the white balance is applicable for the control value Stb, namely a range at which the diaphragm is fully opened, and Lf indicates a range to which the white balance is applicable for the control value Pre and at this range the automatic gain control by the gain amplifier becomes effective.

Namely, strobe light is fully irradiated onto an object to be photographed in a range up to the range Ln, setting is performed so that the control value Stb for a color temperature of strobe light will become dominant (Sn:(10-Sn)= around 8:2) in the range above, so that the control value Pre for a color temperature of external light (room light) having a lower color temperature will become dominant as strobe light is not fully irradiated onto the object, and further so that Sf:(10-Sf) will be equal to around 6:4 beyond the range Ln.

In an area between the range Ln and range Lf, as shown in FIG. 3, a distribution factor for the control values Pre and Stb will change according to allotment with the proportional relation maintained. For this reason, the equation (2) above can be used for obtaining a distribution factor SL for the control value Pre in an area from this range Ln up to the range Lf.

A control value GainL for white balance when strobe light is generated is decided through the following equation according to the distribution factor SL obtained as described above.

$$GainL = \{Pre \times SL + Stb \times (10-SL)\}/10 \quad (3)$$

Namely, the white balance control value GainL when strobe light is generated is obtained by adding weight according to the distribution factor SL for the control value Pre for a color temperature of external light, and by adding weight according to the distribution factor (10-SL) for the control value Stb for a color temperature of strobe light (step S6).

Then the CPU 121 decides a coefficient KL, referring to the parameter memory 124, according to brightness information for a photographed object obtained from the digital signal processing section 106, and also decides values of the gain amplifier control signals 253, 255 by multiplying the white balance control value GainL when strobe light is generated by this coefficient KL (step 7).

Then, if strobe light is generated during regular exposure, the white balance is adjusted according to the gain amplifier control signals 253, 255 (control value GainL * KL) decided in step S7 (step S8). A result of this regular exposure is subjected to the CDS processing, DPS processing, compression processing or the like and is finally recorded in the memory 112 or a memory card (step S9).

As described above, with Embodiment 1 of the present invention, the control value Pre according to the color temperature information of external light and the control value Stb set in the parameter memory 124 are proportionally divided according to a range up to the object to be photographed, and a value obtained by multiplying the result by a coefficient KL based on brightness information of the object to be photographed is decided as a control value for white balance when strobe light is generated, and white balance when strobe light is generated is adjusted according to the control value at a regular exposure, so that appropriate white balance can be maintained regardless of the situation of the object to be photographed, a range from an object to be photographed, and optical conditions around the object to be photographed, and for this reason the unnatural characteristics due to the difference between a color tone of an object to be photographed and that of the background can be reduced even under strobe light.

Also in a digital camera having a mode for compulsorily making a strobe emit light such as the "daytime synchronous mode where an object to be photographed has brightness higher than that obtained when light is automatically generated from an automatic strobe, proportional allotment between the control values Pre and Stb is as shown by a dotted line in FIG. 3.

Namely, in this case, as an equation for computing a distribution factor for the control value Pre in a range between the range Ln and range Lf, the following equation is available in a range between the range Ln and range kLf in place of the equation (2) above taking into account Lf correction coefficient in the daytime synchronous mode.

$$SL = Sn + \{(Sf-Sn)/(kLf \times Lf-Ln)\} \times (Lx-Ln) \quad (4)$$

It should be noted that the control value GainL for white balance when strobe light is generated according to proportional allotment between the control values Pre and Stb may be used only when an operator specifies the "daytime synchronous mode" with the operating section 123.

Also the proportional allotment between the control values Pre and Stb by the CPU 121 may be executed according to a range based on range information corrected by a position correcting means for a main object to be photographed. Herein as a correcting method with the position correcting means, it is conceivable that an operator specifies a position with the operating section 123, or that a position is corrected with the sight line inputting means described above according to an operator's sight line. With this feature, it becomes possible to set a control value for white balance according to accurate range information for an object to be photographed, and more accurate white balance can be realized.

Also a decision of the white balance control value GainL by the CPU 121 when strobe light is generated may be executed taking into account temperature information obtained by the temperature information acquiring means. Generally when a temperature is low, a quantity of light generated by a strobe 127 becomes smaller, while the quantity becomes larger as a gain in a gain amplifier becomes lower, and thus changes occur in photographing conditions according to a temperature of a device, but it becomes possible to maintain appropriate white balance even against the changes relating to a temperature as described above by correcting a quantity of light or a gain in a gain amplifier taking into account temperature information.

Embodiment 2 of the present invention described below has the same configuration and functions as those in Embodiment 1 described above, but more detailed specifications are introduced for an area for adjusting white balance when strobe light is generated. It is assumed herein that the base configuration is the block configuration shown in FIG. 1 and described in relation to Embodiment 1.

Figure 5:
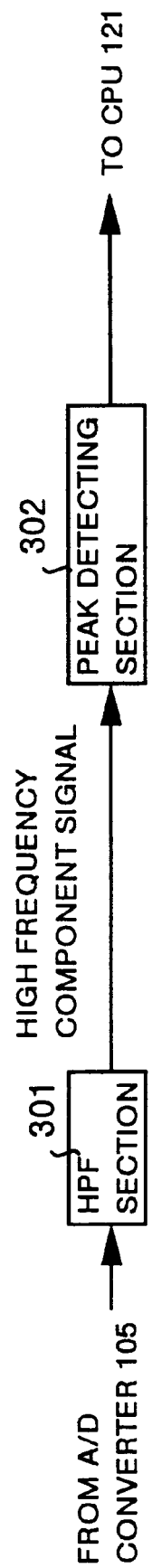
FIG. 5 is a block diagram showing configuration of a key section of a digital camera according to Embodiment 2 of the present invention.

FIG. 5 is a block diagram showing a configuration of a key section of a digital camera according to Embodiment 2 of the present invention. In the digital camera according to Embodiment 2, as shown in FIG. 5, an HPF section 301 comprising a plurality of characteristics-variable high-pass filters (described as HPF hereinafter) and a peak detecting section 302 are connected to a section between the A/D convertor (Refer to FIG. 1) and the CPU 121.

The HPF section 301 is connected to the A/D convertor 105, extracts high frequency components of a brightness signal obtained when the image is photographed, and outputs the high frequency components as a high frequency component signal (an evaluation value) to the peak detecting section 302. The peak detecting section 302 detects, when the high frequency component signal outputted from the HPF section 301 exceeds a threshold value changing according to the photographing conditions (such as a contrast state), a value of the high frequency component signal as a peak, and outputs the value as a peak detection signal to the CPU 121.

Figure 6:
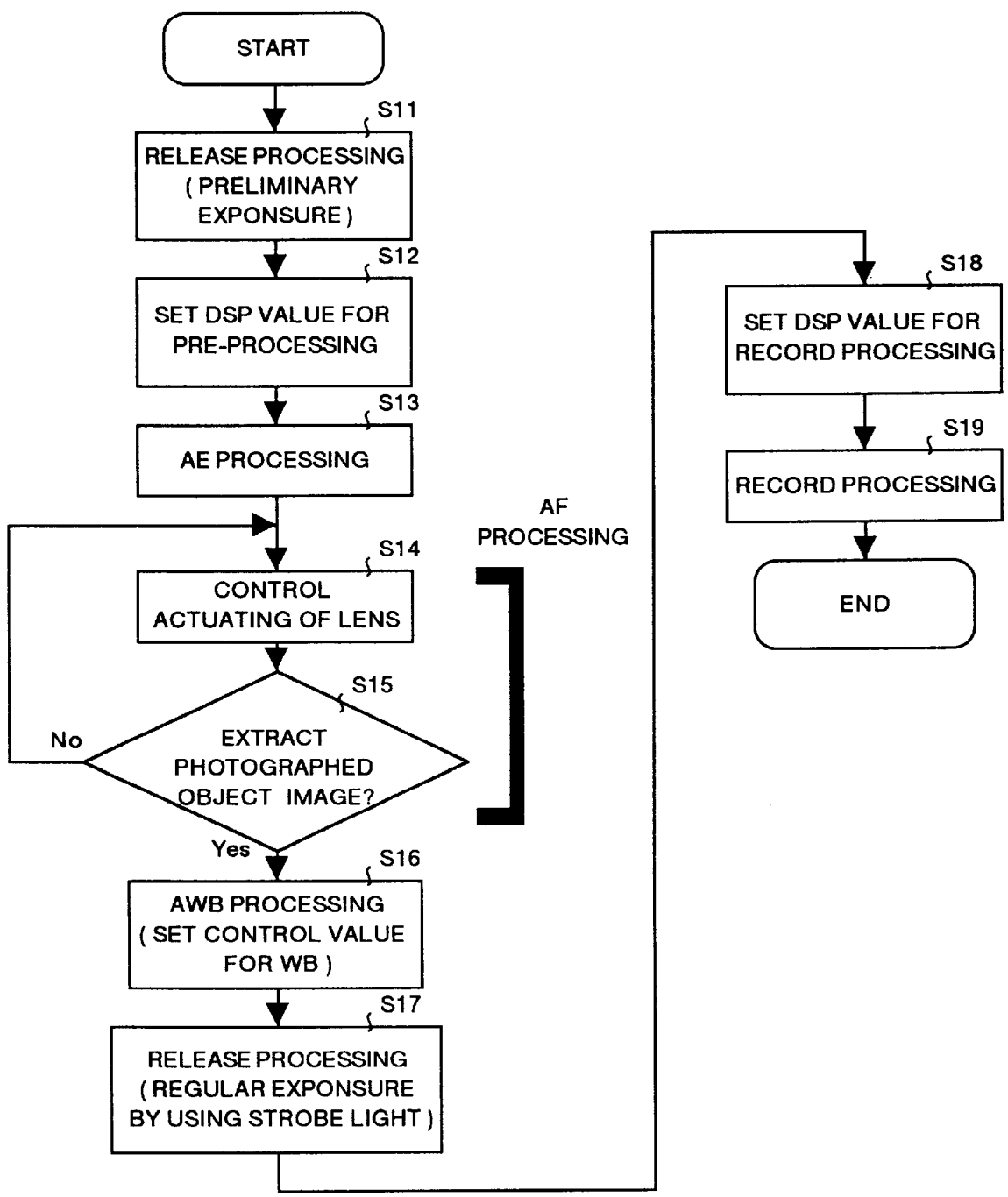
FIG. 6 is a flow chart showing operations in Embodiment 2.

The next description is made for operations. FIG. 6 is a flow chart showing operations in Embodiment 2, FIGS. 7A to 7C are views showing a pre-scan method according to Embodiment 2, and FIG. 8 is a graph showing a relation between a brightness level and a screen position in Embodiment 2.

Figure 7A:
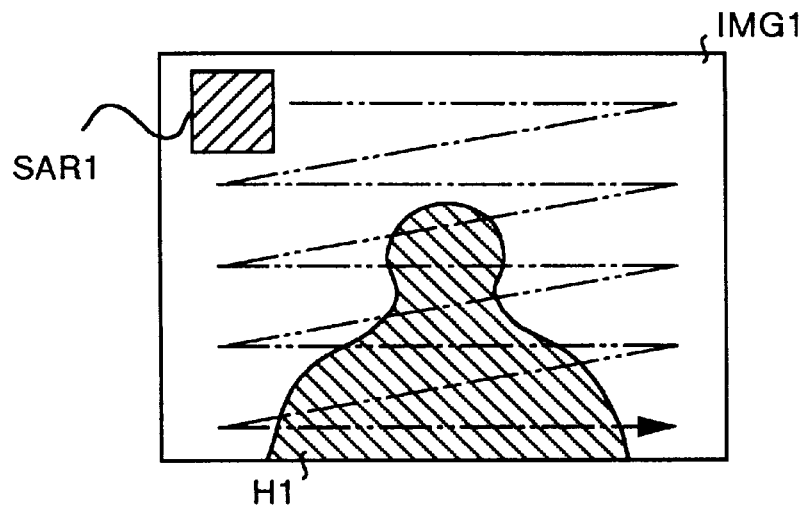
FIGS. 7A to 7C are views explaining a pre-scan method in Embodiment 2.
Figure 7B:
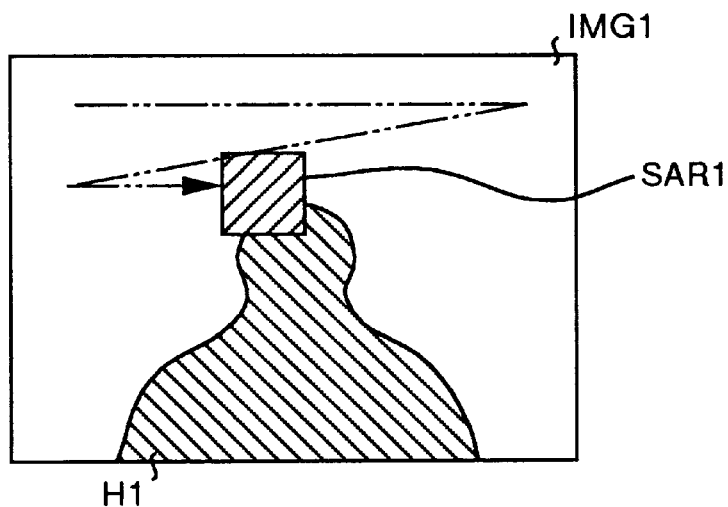
Figure 7C:
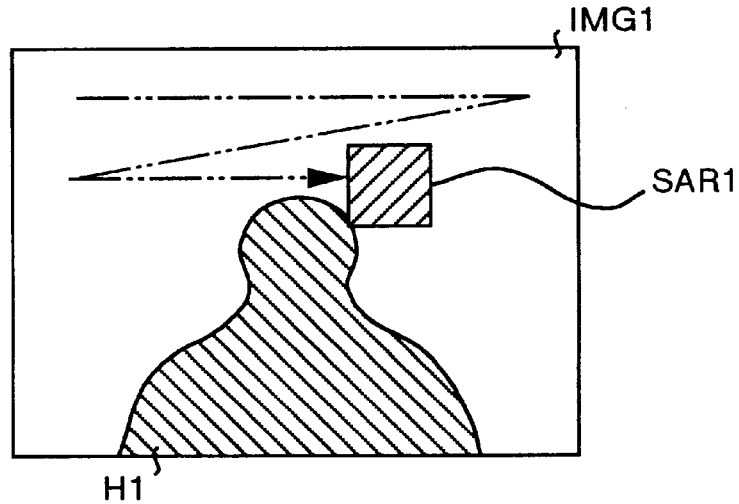
Figure 8:
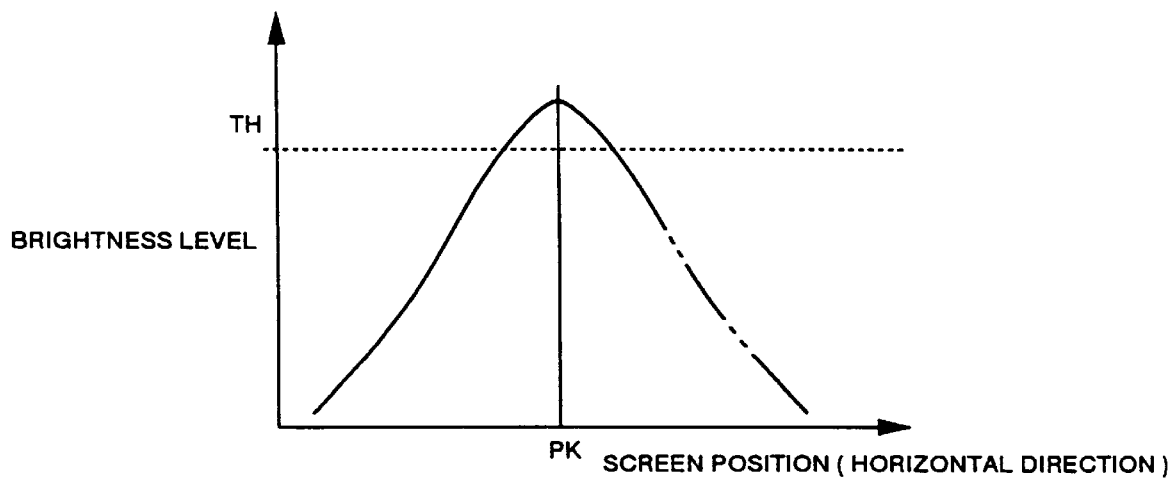
FIG. 8 is a view showing a graph for a relation between a brightness level and a screen position in Embodiment 2.

After power is turned ON, when the ordinary processing for initialization is complete, an image IMG1 (including an image H1 of an object to be photographed) showing a range to be photographed is displayed, as shown in FIG. 7A, in a view finder not shown herein or on the display section 122. In this state, if the release button 123A is operated, preliminary exposure to the image IMG1 is started (step S11). In this stage of preliminary exposure, such operations as AE (automatic exposure control), AF (automatic focus control), and AWB (automatic white balance control) are executed, thus conditions for regular exposure to be executed successively are ready.

Concretely, after the release button 123A is operated, at first such operations as setting various types of timing for preliminary exposure for setting a DSP (digital signal processing) value for preliminary exposure or setting a matrix coefficient for RGB conversion are executed (step S12). Then at first AE processing is executed according to a result of preliminary exposure, namely to a quantity of light reflected by an object to be photographed, and then appropriate conditions for regular exposure are decided (step S13).

Then AF processing is executed according to a result of preliminary exposure, namely a brightness level of the object to be photographed. In this AF processing, the lens 101 is actuated under control by a motor driver 125 according to a result of preliminary exposure, and a peak point of brightness level is detected from a result of preliminary exposure. Concretely, a detection area SAR1 for detecting a brightness level on the image IMG1 is scanned in a direction along the alternate long and two short dashed lines in FIG. 7A, while the peak detecting section 302 determines whether a threshold value TH has been surpassed as shown in FIG. 8 or not. This threshold value TH varies according to conditions such as contrast state.

When a brightness level of a photographed object image H1 within the image IMG1 is higher than the threshold value TH, the peak point PK shown in FIG. 8 is detected through scanning the area shown in FIG. 7B to FIG. 7C, and the peak value is detected as a focus point. Accordingly, the lens 101 (the object is a focus lens) is actuated in step S14 to focus a light beam onto the focus point detected as described above. By repeating this operation for scanning for one screen, the photographed object image H1 is extracted. As a result, an area of the photographed object image H1 within the image IMG1 is obtained as an AF evaluation value (step S15).

As described above, when the AF evaluation value is obtained by extracting the photographed object image H1 in step S15, in the subsequent step S16, the area of the photographed object image H1 expressed by the AF evaluation value is decided as a range to which the white balance control value is applicable when strobe light is generated. Then, like in a case of Embodiment 1 described above, a white balance control value is set making use of the color temperature information for external light obtained in preliminary exposure. The details were already described above in relation to Embodiment 1, so that description thereof is omitted herein.

Then the release button 123A is operated and regular exposure using strobe light is executed (step S17), when such operations as setting various types of timing for setting a DSP value for regular exposure or setting a matrix coefficient for RGB conversion are executed (step S18). A result of the regular exposure as described above is subjected to such processing as CDS processing, DSP processing, or compression processing and is finally recorded in the memory 112 or a memory card (step S19).

As described above, in Embodiment 2, high frequency components extracted from a brightness signal are extracted according to the photographing conditions such as contrast, and an area of an object to be photographed is extracted according to a brightness signal for the high frequency components, so that a range for extracting high frequency components varies according to the photographing conditions, and for this reason an area of an object to be photographed can accurately be extracted.

Also an area of an object to be photographed is extracted according to a result of preliminary exposure, and a white balance control value for the photographed object area when strobe light is generated is decided, so that appropriate white balance can be maintained for the object to be photographed.

Further a focal position is extracted, while scanning, as an area of an object to be photographed, so that a photographed object area is extracted during scanning, and because of this feature, a period of time required for preliminary exposure for regular exposure can be shortened.

The scanning technique to an image obtained according to a result of preliminary exposure was not described concretely in relation to Embodiment 2, but a detection area in scanning may be varied for enabling more efficient extraction of a photographed object image as in Embodiment 3 described below. It should be noted that the base of Embodiment 3 is the configuration described in relation to Embodiment 2.

Figure 9:
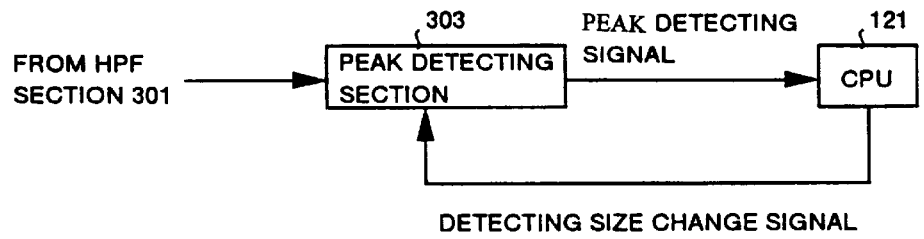
FIG. 9 is a block diagram showing a configuration of a key section of a digital camera according to Embodiment 3 of the present invention.

Description is made below for only characteristic portions of Embodiment 3. FIG. 9 is a block diagram showing a configuration of a key section of a digital camera according to Embodiment 3 of the present invention. The digital camera according to Embodiment 3 has the configuration in which not the peak detecting section 302, but the peak detecting section 303 is connected to an output terminal of the HPF section 301. The peak detecting section 303 outputs, like the peak detecting section 302, a peak detection signal to the CPU 121, and reduces a detection size upon reception of a detection size change signal for instructing change of a detection size from the CPU 121.

Figure 10:
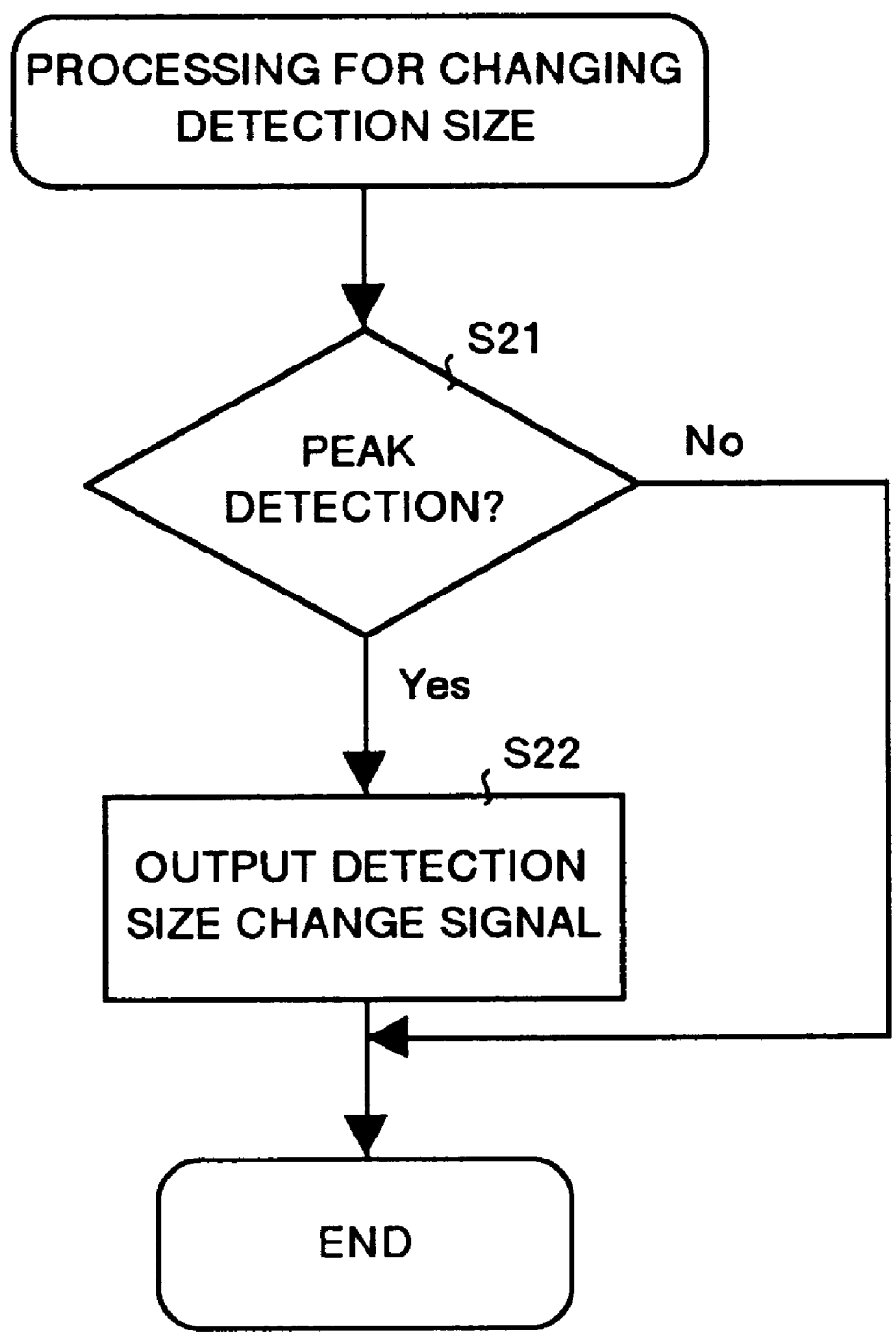
FIG. 10 is a flow chart showing processing for changing a detection size in Embodiment 3.

Operations in Embodiment 3 are different from operations for scanning described in relation to Embodiment 2 in that a detection size is changed, so that a description is made only for the point herein. FIG. 10 is a flow chart showing the processing for changing a detection size according to Embodiment 3, and FIGS. 11A and 11B are views showing a pre-scan method in Embodiment 3.

Figure 11A:
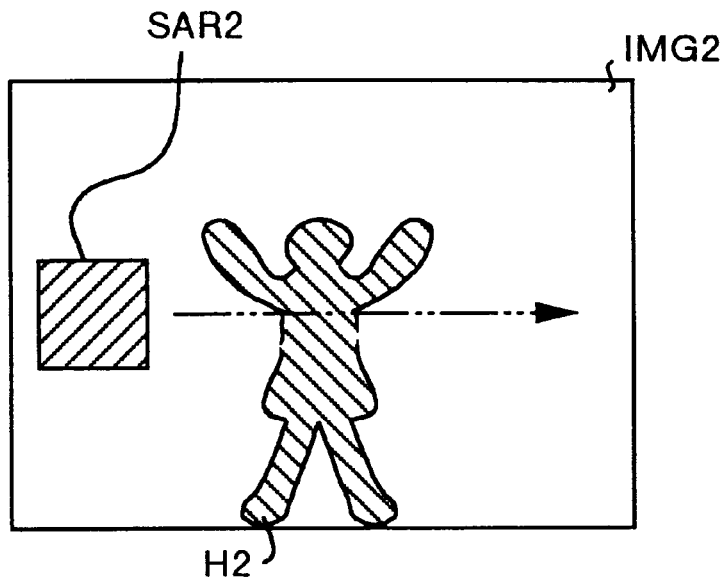
FIGS. 11A and 11B are views showing a pre-scan method in Embodiment 3.
Figure 11B:
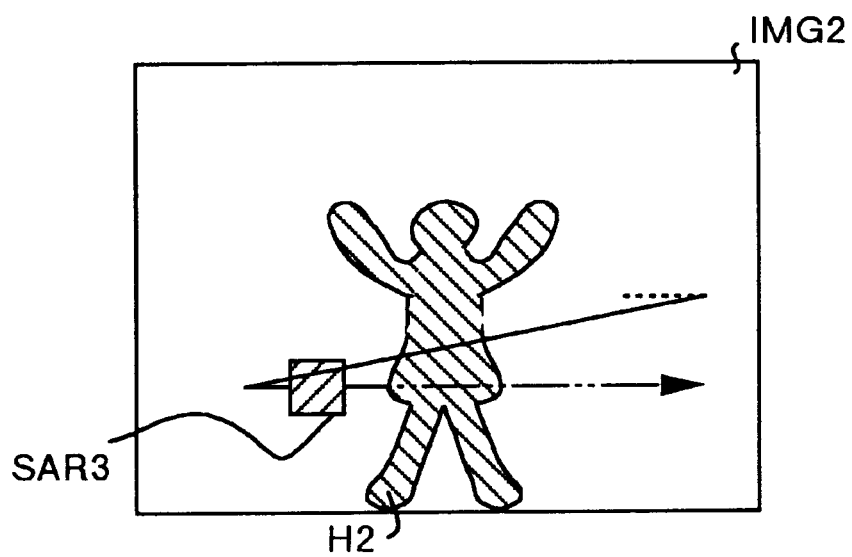

FIGS. 11A and 11B show an image IMG2 obtained through preliminary exposure, and a photographed object image H2 is located substantially at the center. When photographing an object such as a human body, generally the person is located at a center of the image, and for this reason it is assumed herein that, in Embodiment 3, scanning is started from a center of the image IMG2 in the vertical direction on the screen. It should be noted that, although scanning is started from the central position, the starting point is not always limited to the center, and is set to any point in the upper or lower section.

At first scanning in the horizontal direction (in the direction indicated by the alternate long and two short dashed line in FIG. 11A) is started from a central portion of the image IMG2 using a detection area SAR2 having the standard detection size as shown in FIGS. 11A and 11B. In the processing for changing a detection size shown in FIG. 10, peak detection is executed once for one scan in the horizontal direction according to whether the threshold value TH has ben surpassed or not (step S21).

If a brightness level over the threshold value TH is detected, it is determined that the photographed object image H2 is located at a position with a large change in the horizontal scan direction, namely at a position where the threshold value TH is surpassed. According to a result of determination, a position for next scan in the horizontal direction is lowered by one step (or is raised by one step), and a detection size is changed to one smaller than a detection size currently used for the detection area SAR3 (step S22). In this case, the peak detecting section 303 receives a detection size change signal from the CPU 121.

In FIG. 11A, a peak is detected in a substantially central portion according to the photographed object image H2 which is an image of a human body through scanning in the horizontal direction, and after the peak is detected, in the next scan in the horizontal direction, as shown in FIG. 11B, a detection area SAR3 having a detection size smaller than the detection area SAR1 is used. It should be noted that, if it is assumed that a photographed object image H2 for a human body is located substantially at a center in the horizontal direction and a starting point or the next scan in the horizontal direction is, as shown in FIG. 11B, substantially at a center in the horizontal direction, a period of time required for deciding a range to which a white balance control value is applied when strobe light is generated is shortened.

As described above, with Embodiment 3 of the present invention, the scan is started from an arbitrary position regardless of a result of exposure, so that the entire time required for scanning becomes shorter, and with this feature a pre-processing time for regular exposure can be shortened.

Also, in a case where a brightness signal surpasses a preset level, a focal position detection size is made smaller for the next scan, so that, by setting a focal position detection size prior to detection of an object to be photographed to a somewhat larger value, the total number of scans is reduced and also an accurate focal position is obtained by making smaller the focal position detection size after focusing, and with this feature, a scan time prior to detection of an object to be photographed according to a result of exposure can be shortened.

As an application of Embodiment 3 described above, an image area obtained according to a result of preliminary exposure may previously be divided, and a specific control value (white balance control value when strobe light is generated) may be decided for each divided area. It should be noted that the base of Embodiment 4 is the configuration described in relation to Embodiment 3.

Figures 12, 13:
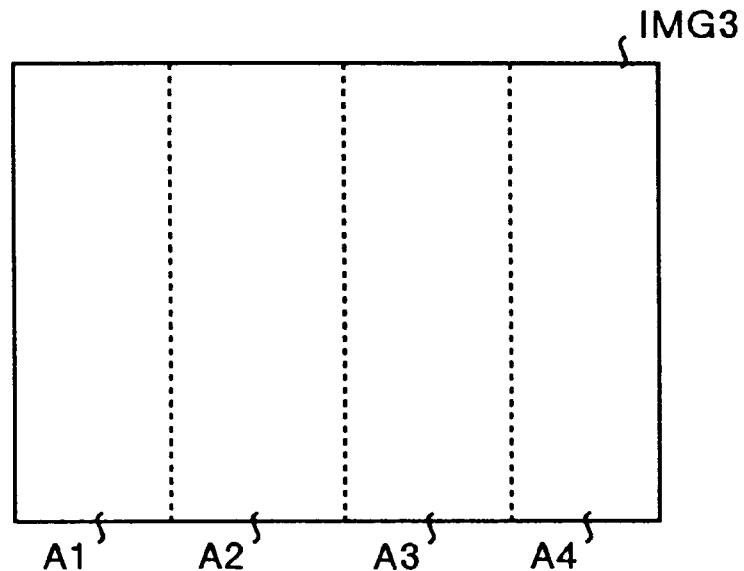
FIG. 12 is a view showing zoning of a detection area in Embodiment 4 of the present invention.
FIG. 13 is a view showing a relation between each zone and proportional allotment (between strobe light and external light) in Embodiment 4.
Figure 14:
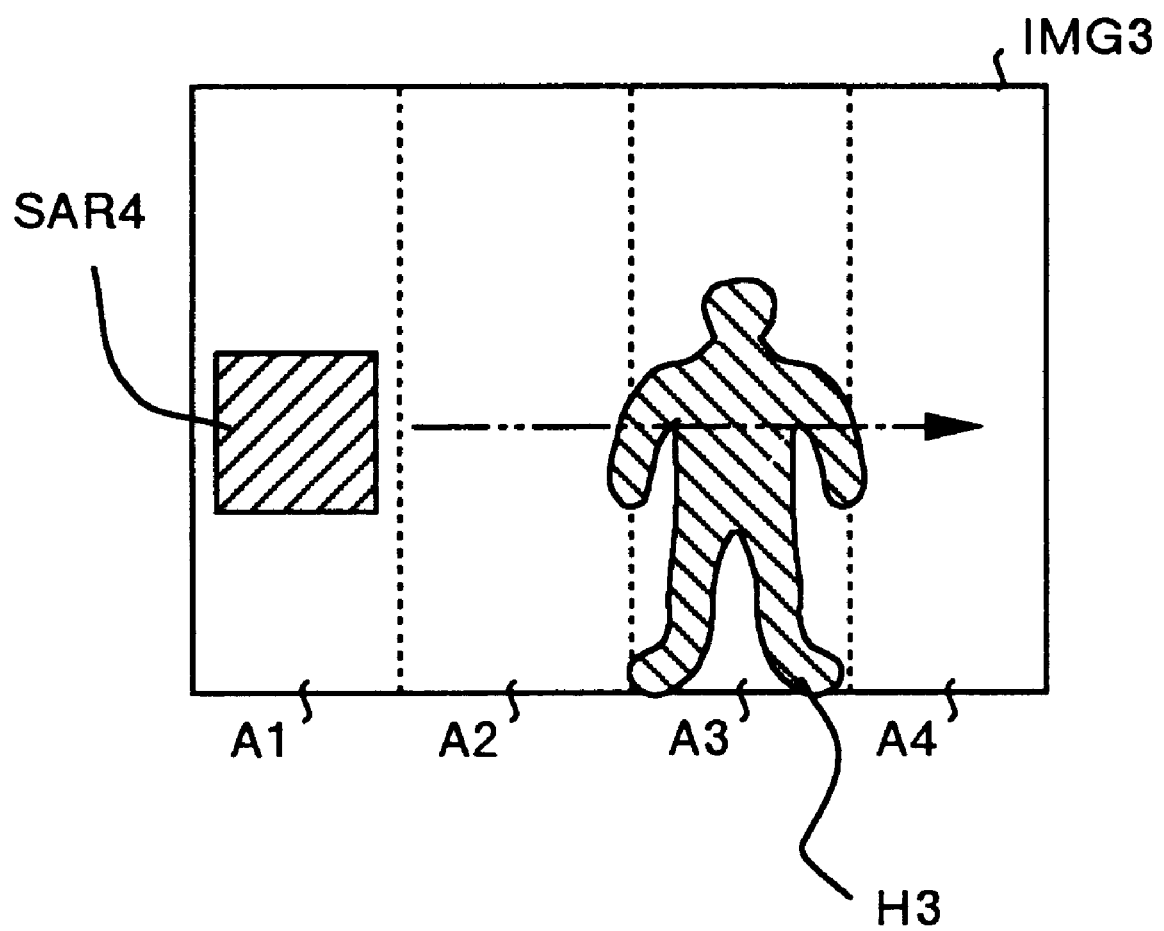
FIG. 14 is a view showing a pre-scan method in Embodiment 4.

The next description is made only for characteristic portions of Embodiment 4. FIG. 12 is a view showing zones of a detection area according to Embodiment 4, FIG. 13 is a view showing a relation between each of the zones and proportional allotment, and FIG. 14 is a pre-scan method according to Embodiment 4.

In Embodiment 4, as shown in FIG. 12, an image area of the image IMG3 obtained according to a result of preliminary exposure is divided, for instance, into four areas of A1, A2, A3, and A4 in the horizontal direction. A relation between each of the areas A1, A2, A3, and A4 and proportional allotment (between strobe light and external light) is previously stored in the parameter memory 124.

Namely, in the parameter memory 24, as shown in FIG. 13, proportional allotment for each area is specified so that the proportional allotment is 5:5 for area A1, 6:4 for area A2, 7:3 for area A3, and 5:5 for area A4.

In a case where the image IMG3 has been obtained according to a result of preliminary exposure and a photographed object image H3 is located within the image IMG3 (Refer to FIG. 14), like in Embodiment 3 described above, the scan for a detection area SAR4 in the horizontal direction is started from a center of the image IMG3 in the vertical direction, and the photographed object image H3 is extracted reducing a size of the detection area SAR4 after the peak is detected.

In the example shown in FIG. 14, the photographed object image H3 is located in the area A3, and proportional allotment for the area A3 is 7 (strobe light):3 (external light), so that the proportional allotment for strobe light to the photographed object image H3 becomes higher, and for this reason, appropriate white balance when strobe light is generated can be realized for the photographed object image H3.

As described above, with Embodiment 4, a range to be scanned is divided into a plurality of zones according to a result of exposure, and a control value is decided independently for each zone according to proportional allotment for each zone between strobe light and external light, so that, by preparing many zones where an object to be photographed is to be allocated, it is possible to maintain appropriate white balance for the object to be photographed.

It should be noted that, in this Embodiment 4, by executing processing for smoothly linking each of the areas A1, A2, A3, and A4, visibility of an edge can be suppressed.

Although a dividing direction in Embodiment 4 is the horizontal direction, the dividing direction is not always limited to the horizontal direction, and division may be performed in the vertical direction.

As described above, with an image inputting apparatus according to the present invention, there is provided the advantage that it is possible to obtain an image inputting apparatus wherein color temperature information for external light is obtained during preliminary exposure, a control value for white balance is decided according to the color temperature information for external light during regular exposure, and white balance when strobe light is generated according to the decided control value is adjusted, so that appropriate white balance can be maintained irrespective of an object to be photographed, and for this reason the unnatural characteristics due to the difference between a color tone of an object to be photographed and that of the background can be reduced under strobe light.

With an image inputting apparatus according to the present invention, there is provided the advantage that it is possible to obtain an image inputting apparatus wherein a control value for white balance when strobe light is generated is decided taking into account not only a preset white balance control value for the color temperature information of strobe light, but also a white balance control value based on the color temperature information for external light obtained during preliminary exposure without strobe light under default photographing conditions, so that appropriate white balance can be maintained irrespective of an object to be photographed, and unnatural characteristics due to the difference between a color tone of the object to be photographed and that of the background can be reduced.

With an image inputting apparatus according to the present invention, there is provided the advantage that it is possible to obtain an image inputting apparatus wherein a white balance control value when strobe light is generated is decided further using proportional allotment corresponding to a range based on range information, so that appropriate white balance can be maintained irrespective of any situation of an object to be photographed nor of a range to an object to be photographed, and unnatural characteristics due to the difference between a color tone of the object to be photographed and that of the background can be reduced.

With an image inputting apparatus according to the present invention, there is provided the advantage that it is possible to obtain an image inputting apparatus wherein a value obtained by multiplying a result of the proportional allotment by a coefficient based on the brightness information is decided as a white balance control value when strobe light is generated, so that appropriate white balance can be maintained irrespective of the situation of an object to be photographed, a range to an object to be photographed nor of optical conditions around the object to be photographed, and for this reason the unnatural characteristics due to the difference between a color tone of the object to be photographed and that of the background can be reduced.

With an image inputting apparatus according to the present invention, there is provided the advantage that it is possible to obtain an image inputting apparatus wherein a white balance control value when strobe light is generated is decided only in a case where the compulsory light emitting mode has been set, so that the unnatural characteristics of a photographed image can be eliminated even in the compulsory light emitting mode such as the "daytime synchronous mode".

With an image inputting apparatus according to the present invention, there is provided the advantage that it is possible to obtained an image inputting apparatus where further proportional allotment is executed according to a range based on corrected range information for a main object to be photographed, so that a white balance control value based on an accurate range to an object to be photographed can be set, and for this reason, more appropriate white balance can be realized.

With an image inputting apparatus according to the present invention, there is provided the advantage that it is possible to obtain an image inputting apparatus wherein proportional allotment is executed according to a range based on range information for a position of an object to be photographed, said position corrected by an operator, for a main object to be photographed, so that a white balance control value based on accurate range information for an object to be photographed can be set, and for this reason more appropriate white balance can be realized.

With an image inputting apparatus according to the present invention, there is provided the advantage that it is possible to obtain an image inputting apparatus wherein further proportional allotment is executed according to a range based on range information for a position of an object to be photographed, said position corrected by inputting sight line, for a main object to be photographed, so that a white balance control value can be set according to accurate range information for an object to be photographed, and for this reason more appropriate white balance can be realized.

With an image inputting apparatus according to the present invention, there is provided the advantage that it is possible to obtain an image inputting apparatus wherein a white balance control value when strobe light is generated is decided by acquiring temperature information and taking into account the temperature information, so that appropriate white balance can be maintained even against changes in the photographing conditions due to a temperature of the apparatus.

With an image inputting apparatus according to the present invention, there is provided the advantage that it is possible to obtain an image inputting apparatus wherein a white balance control value when strobe light is generated is decided, by extracting a photographed object area from a result of preliminary exposure, only for the photographed object area, so that appropriate white balance can be maintained for the object to be photographed.

With an image inputting apparatus according to the present invention, there is provided the advantage that it is possible to obtain an image inputting apparatus wherein a focal position is extracted by scanning as a photographed object area, so that a photographed object area is extracted during scanning, and for this reason, a period of time required for preliminary exposure for regular exposure can be shortened.

With an image inputting apparatus according to the present invention, there is provided the advantage that it is possible to obtain an image inputting apparatus wherein scanning is started from an arbitrary position irrespective of a result of exposure, so that the entire scan time is shortened, and for this reason a pre-processing time for regular exposure can be shortened.

With an image inputting apparatus according to the present invention, there is provided the advantage that it is possible to obtain an image inputting apparatus wherein a focal position detection size is made smaller and subsequent scanning is executed with the smaller detection size in a case where a brightness signal exceeds a preset level, so that, by setting a focal position detection size prior to detection of an object to be photographed to a somewhat larger value, the total times of scanning is reduced, and also a focal position can accurately be acquired by making the focal position detection size smaller after focusing, and with this feature a scan time before detection of an object to be photographed from a result of exposure can be shortened.

With an image inputting apparatus according to the present invention, there is provided the advantage that it is possible to obtain an image inputting apparatus wherein a range to be scanned for a result of exposure is divided into a plurality of zones, and a control value is independently decided for each zone according to proportional allotment between luminance of strobe light and that of external light in each zone, so that appropriate white balance can be maintained for an object to be photographed by allotting a larger portion to the zone where the object to be photographed is located.

With an image inputting apparatus according to the present invention, there is provided the advantage that it is possible to obtain an image inputting apparatus wherein high frequency elements are extracted from a brightness signal according to photographing conditions such as contrast, and a photographed object area is extracted according to the brightness signals for the high frequency elements, so that a range for extraction of high frequency elements changes according to the photograph conditions, and with this feature, a photographed object area can be extracted according to the photographing conditions.

With an image inputting apparatus according to the present invention, there is provided the advantage that it is possible to obtain an image inputting apparatus wherein temperature information for external light is obtained and also a photographed object area is extracted according to a result of preliminary exposure, a white balance control value for strobe light is decided according to the extracted color temperature information only for the extracted photographed object area, and a result of regular exposure using the strobe light with the decided control value is subjected to signal processing, so that signal processing is executed with appropriate white balance irrespective of an image of an object to be photographed, and for this reason, the unnatural characteristics due to the difference between a color tone of an object to be photographed and that of the background can be reduced under strobe light.

This application is based on Japanese Patent Application Nos. HEI 8-077916 and HEI 9-048302 filed in the Japanese Patent Office on Mar. 29, 1996 and Mar. 3, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image inputting apparatus comprising:
   a pre-measuring device for obtaining color temperature information according to external light in preliminary exposure;
   a control value deciding device for deciding a control value for white balance according to the color temperature information according to the external light obtained by said pre-measuring device;
   an adjusting device for adjusting the white balance when a strobe light is generated according to the control value decided by said control value deciding device in regular exposure;
   a setting device for setting the control value for white balance according to information for color temperature due to the strobe light;
   wherein said control value deciding device decides the control value for white balance when the strobe light is generated by way of proportional allotment of the control value based on the color temperature information according to the external light obtained by said pre-measuring device as well as to the control value set by said setting device;
   a range measuring device for measuring a range to an object to be photographed;
   wherein said control value deciding device decides the control value for white balance when the strobe light is generated by way of proportional allotment of the control value based on the color information according to the external light obtained by said pre-measuring device and the control value set by said setting device according to a range based on range information obtained by said range measuring device;
   a position correcting device for correcting a position of a main object to be photographed among objects to be photographed;
   wherein said control value deciding device executes proportional allotment of the control value based on the color temperature information according to external light obtained by said pre-measuring device and the control value set by said setting device according to a range based on range information provided from said position correcting device;
   a photographed object extracting device for extracting an area of an object to be photographed according to a brightness signal indicating a result of exposure obtained by said pre-measuring device in preliminary exposure;
   wherein said control value deciding device decides the control value for white balance only in the area of an object to be photographed and extracted by said photographed object extracting device, when the strobe light is generated, according to the color temperature information according to external light obtained by said pre-measuring device;
   wherein said photographed object extracting device has a focusing device for detecting a focal position from a peak of said brightness signal scanning a result of exposure and extracts the focal position detected by said focusing device as an area of said photographed object.

2. An image inputting apparatus according to claim 1, wherein said focusing device executes scanning with a first focal position detection size and continues scanning with a second focal position detection size smaller than said first focal position detection size when said brightness signal exceeds a prespecified level.

3. An image inputting apparatus according to claim 1, wherein said control value deciding device divides a range of scanning into a plurality of zones according to said result of exposure and decides an independent control value for each zone by way of proportional allotment between strobe light and external light previously decided for each zone.

4. An image inputting apparatus according to claim 1, wherein said focusing device starts scanning from an arbitrary position against said result of exposure.

5. An image inputting apparatus according to claim 4, wherein said focusing device executes scanning with a first focal position detection size and continues scanning with a second focal position detection size smaller than said first focal position detection size when said brightness signal exceeds a prespecified level.

6. An image inputting apparatus according to claim 4, wherein said control value deciding device divides a range of scanning into a plurality of zones according to said result of exposure and decides an independent control value for each zone by way of proportional allotment between strobe light and external light previously decided for each zone.

* * * * *